(12) United States Patent
Kim et al.

(10) Patent No.: US 9,569,783 B2
(45) Date of Patent: Feb. 14, 2017

(54) ADVERTISEMENT SYSTEM BASED ON SMART CARD, A METHOD THEREOF, AND SMART CARD APPLIED TO THE SAME

(75) Inventors: Seung Hwan Kim, Seongnam-si (KR); Jae Sung Hong, Seoul (KR)

(73) Assignee: SK PLANET CO., LTD., Seongnam-si, Gyeonggi-do (KR)

( * ) Notice: Subject to any disclaimer, the term of this patent is extended or adjusted under 35 U.S.C. 154(b) by 1495 days.

(21) Appl. No.: 12/866,105

(22) PCT Filed: Apr. 28, 2009

(86) PCT No.: PCT/KR2009/002214
§ 371 (c)(1),
(2), (4) Date: Aug. 4, 2010

(87) PCT Pub. No.: WO2010/024513
PCT Pub. Date: Mar. 4, 2010

(65) Prior Publication Data
US 2011/0035286 A1 Feb. 10, 2011

(30) Foreign Application Priority Data

Aug. 28, 2008 (KR) .................. 10-2008-0084641
Oct. 6, 2008 (KR) .................. 10-2008-0097823

(51) Int. Cl.
*G06Q 30/02* (2012.01)
*H04W 4/20* (2009.01)
(Continued)

(52) U.S. Cl.
CPC .......... *G06Q 30/02* (2013.01); *G06Q 30/0251* (2013.01); *G06Q 30/0269* (2013.01);
(Continued)

(58) Field of Classification Search
CPC ..................................... G06Q 30/02
(Continued)

(56) References Cited

U.S. PATENT DOCUMENTS

2007/0055565 A1 3/2007 Baur et al.
2009/0144361 A1* 6/2009 Nobakht et al. .............. 709/203

FOREIGN PATENT DOCUMENTS

JP 2002092479 3/2002
JP 2003125098 4/2003
(Continued)

OTHER PUBLICATIONS

Korean Office Action for 10-2008-0097823 dated Nov. 23, 2011 citing the above references(s).
(Continued)

*Primary Examiner* — Sun Li
(74) *Attorney, Agent, or Firm* — Hauptman Ham, LLP

(57) ABSTRACT

Disclosed are a system and a method for providing an advertisement service and a smart card applied to the same. The system includes the smart card to extract meta data by searching for accumulated and processed personalized information according to the request for a personalized advertisement from a user terminal, and to provide the URL information for advertisement contents by searching for the advertisement contents, which are embedded based on the SCWS function, according to the meta data to provide the URL information of the advertisement contents. Personalized information is obtained based on the SCWS function and the USIM, and a messaging advertisement service is realized based on the personalized information, so that information focusing on a use extracted through personal behavior analysis is provided.

7 Claims, 10 Drawing Sheets

(51) Int. Cl.
*H04L 12/58* (2006.01)
*H04L 29/08* (2006.01)
*H04W 4/12* (2009.01)

(52) U.S. Cl.
CPC ............ *H04L 51/063* (2013.01); *H04L 67/02* (2013.01); *H04W 4/206* (2013.01); *H04L 51/08* (2013.01); *H04L 67/30* (2013.01); *H04W 4/12* (2013.01)

(58) Field of Classification Search
USPC .......................................... 705/14.66, 14.49
See application file for complete search history.

(56) References Cited

FOREIGN PATENT DOCUMENTS

| | | |
|---|---|---|
| JP | 2006526229 A | 11/2006 |
| JP | 2010502143 | 1/2010 |
| KR | 1020010106279 | 11/2001 |
| KR | 2002-0032519 | 5/2002 |
| KR | 1020050050757 | 6/2005 |
| KR | 1020060083825 | 7/2006 |
| KR | 102006010406 | 10/2006 |
| KR | 1020060104031 | 10/2006 |
| KR | 1020070073643 | 7/2007 |
| KR | 1020080046851 | 5/2008 |
| KR | 10-1017639 | 2/2011 |
| TW | 518865 B | 1/2003 |
| WO | 2008025578 A1 | 3/2008 |

OTHER PUBLICATIONS

International Search Report for PCT/KR2009/002214, citing the above reference(s).
Notice of Allowance for Application No. 10-2008-0097823 dated Jan. 22, 2013, citing the above reference(s).
Notice of Allowance for Patent Application No. 10-2008-0084641 dated Nov. 8, 2012 citing the above references(s).
Japanese Notice of Allowance for application No. 2011-524884 dated Aug. 16, 2013, citing the above reference(s).
Japanese Office Action for application No. 2011-524884 dated May 7, 2013, citing the above reference(s).
Chinese Office Action for application No. 200980105971.X dated Sep. 9, 2013, citing the above reference(s).

* cited by examiner

ADVERTISEMENT SYSTEM BASED ON SMART CARD, A METHOD THEREOF, AND SMART CARD APPLIED TO THE SAME

CROSS REFERENCE TO RELATED APPLICATION

This application claims the priority of Korean Patent Application No. 10-2008-0084641, filed on Aug. 28, 2008 and the priority of Korean Patent Application No. 10-2008-0097823, filed on Oct. 6, 2008 in the KIPO (Korean Intellectual Property Office), the disclosure of which are incorporated herein in their entirety by reference. Further, this application is the National Phase application of International Application No. PCT/KR2009/002214, filed Apr. 28, 2008, which designates the United States and was published in English. Each of these applications is hereby incorporated by reference in their entirety into the present application.

TECHNICAL FIELD

Exemplary embodiments relate to an advertisement service based on a smart card, and more particularly, to a system and a method for providing an advertisement service and the smart card applied to the same, capable of providing a personalized messaging advertisement service by utilizing personalized information stored in the smart card in cooperation with a smart card web server.

BACKGROUND ART

An advertisement service using a cellular phone may be a spam or a push-type advertisement service performed by specific companies. In other words, most advertisement services have been unilaterally received in the cellular phone regardless of the intention of a user.

In detail, since most advertisement messages are not intended by the user, the messages may annoy the user. In addition, the messages contain meaningless information which is not useful to the user, so the user who receives the messages may not be interested in the advertisements of the messages. Thus, consumers may not pay attention to the advertisements.

In addition, a significant amount of cost is wasted due to unilateral advertisements that do not attract customers' interest.

DISCLOSURE

Technical Problem

Exemplary embodiments may provide a system and a method for providing an advertisement service, and a smart card applied to the same, capable of obtaining personalized information based on a SCWS (smart card web server) function and a USIM (universal subscriber identity module) supported by the smart card, and realizing a messaging advertisement service based on the personalized information.

Technical Solution

According to one or more embodiments, there may be provided an advertisement service system, the advertisement service system including: a user terminal for requesting a personalized advertisement when a messaging service is received, and downloading advertisement contents linked a uniform resource locator (URL) of the advertisement contents, which is received from the smart card according to the request of the personalized advertisement; and the smart card for searching for stored and processed personalized information according to an operation of the smart card, extracting meta data, searching for the advertisement contents stored in the smart card based on the meta data, and providing the uniform resource locator of the advertisement contents that have been searched, as the user terminal requests the personalized advertisement.

According to one or more embodiments, there may be provided a user terminal for providing a personalized advertisement in cooperation with a smart card supporting a smart card web server function, the user terminal including: a message processing module for requesting the personalized advertisement to the smart card when a messaging service is received, and requesting download of advertisement contents based on a uniform resource locator of the advertisement contents received from the smart card; and a browser for downloading the advertisement contents linked the uniform resource locator of the advertisement contents according to the request of the message processing module, and displaying the advertisement contents.

According to one or more embodiments, there may be provided a smart card for providing a personalized advertisement in cooperation with a user terminal based on a smart card web server, the smart card including: an advertisement processing module for requesting extraction of personalized information when a providing request of the personalized advertisement is received from the user terminal, extracting and providing meta data by searching for the extracted personalized information, and transmitting a uniform resource locator of advertisement contents, which is searched for based on the meta data, to the user terminal; a personalized information processing module for extracting and storing stored and processed personalized information according to operation of the smart card, extracting the personalized information according to a extraction request of the personalized information of the advertisement processing module, and providing the personalized information to the advertisement processing module; a content storing module for storing updated advertisement contents provided from an advertisement providing server through the advertisement processing module; and a content managing module for searching for advertisement contents stored in the content storing module based on the meta data received from the advertisement processing module and providing a uniform resource locator of the advertisement contents.

According to one or more embodiments, there may be provided a method for providing an advertisement service based on a smart card, the method including: requesting, by a user terminal, a personalized advertisement to the smart card when a messaging service is received through a mobile communication network; searching, by the smart card, a personalized information, which are stored and processed according to operation of the smart card, and extracting meta data when a providing request of the personalized advertisement is received from the user terminal; searching, by the smart card, advertisement contents stored based on the meta data and providing a uniform resource locator of the advertisement contents; and downloading and displaying, by the user terminal, linked advertisement contents based on the uniform resource locator of the advertisement contents received from the smart card.

According to one or more embodiments, there may be provided an operating method of a user terminal for providing a personalized advertisement in cooperation with a smart card supporting a smart card web server function, the operating method including: requesting the personalized advertisement to the smart card when a messaging service is received; displaying a uniform resource locator of advertisement contents received from the smart card according to the request of the personalized advertisement; requesting download of the advertisement contents when user intention to receive the advertisement contents is received through a screen in which the messaging service is displayed; downloading advertisement contents linked the uniform resource locator of the advertisement contents according to the download request; and displaying the downloaded advertisement contents.

According to one or more embodiments, there may be provided an operating method of a smart card for providing personalized information in cooperation with a user terminal based on a smart card web server, the operating method including: receiving a providing request of a personalized advertisement from the user terminal; extracting personalized information; extracting meta data by searching for the personalized information; searching for advertisement contents stored in the smart card based on the meta data; and providing a uniform resource locator of the advertisement contents.

Advantageous Effects

As described above, according to the system and the method for providing an advertisement service, and the smart card applied to the same, personalized information is obtained based on an SCWS function and a USIM supported by the smart card, and a messaging advertisement service is realized based on the personalized information, thereby providing information focusing on the user extracted through personal behavior analysis. Accordingly, the user can be attracted by the active and interesting participation entailed.

BEST MODE

Mode for Invention

Figure 1:
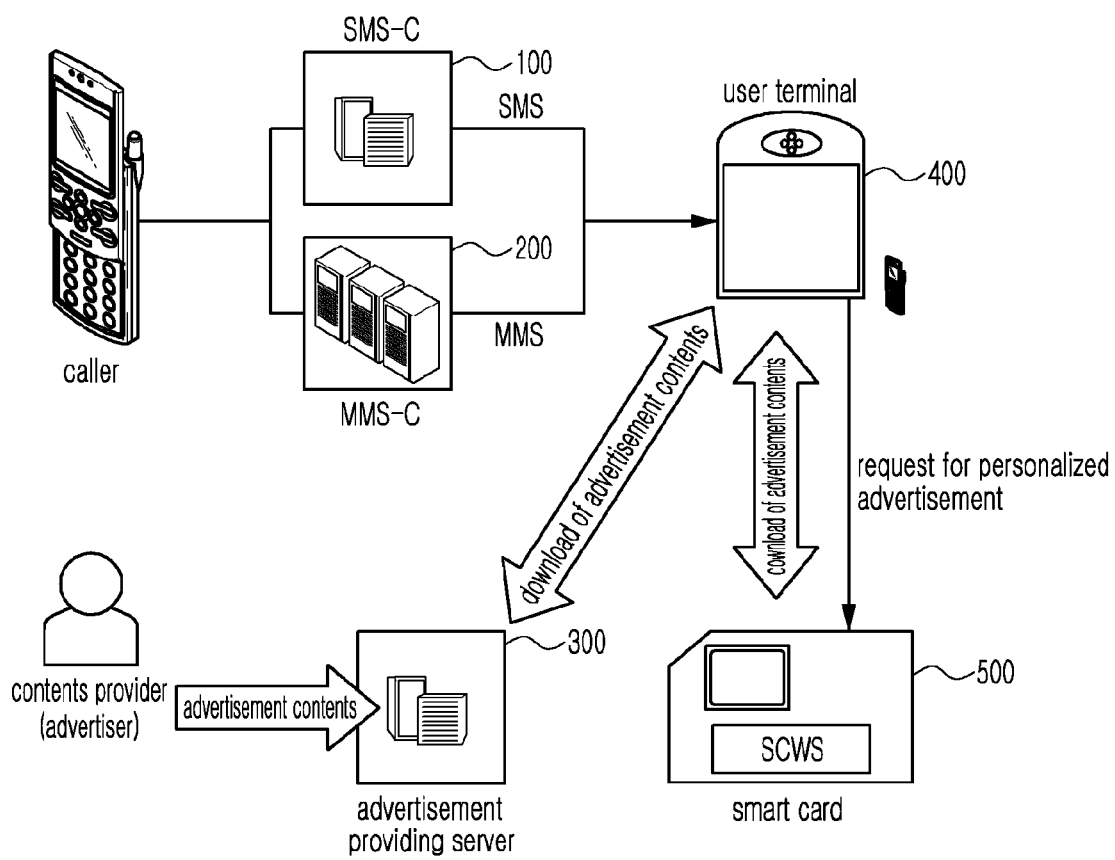
FIG. 1 is a schematic view showing an advertisement service system based on a smart card according to an embodiment of the present invention.
Figure 2:
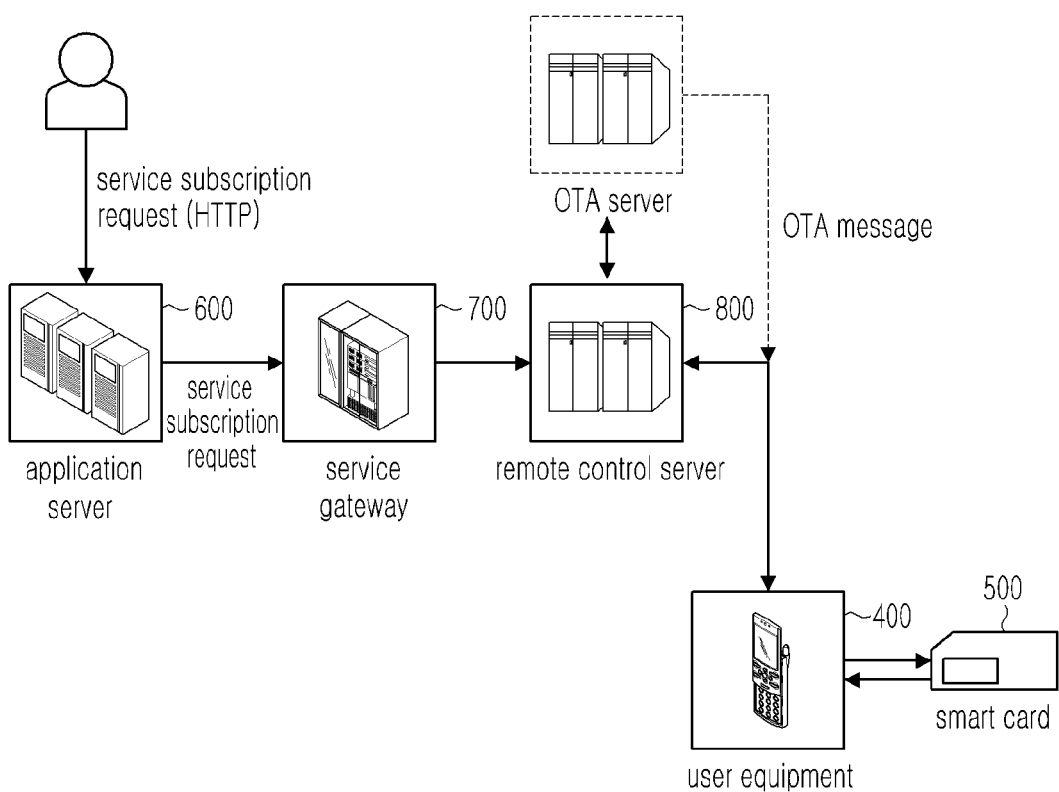
FIG. 2 is a view showing the installation environment of a smart card according to an embodiment of the present invention.

Hereinafter, exemplary embodiments of the present invention will be described with reference to accompanying FIG. 1 is a schematic view showing an advertisement service system based on a smart card according to an embodiment of the present invention.

As shown in FIG. 1, the advertisement service system includes a short message service center (SMS-C) 100 that transmits an SMS, a multimedia message service center (MMS-C) 200 that transmits an MMS, an advertisement providing server 300 that provides updated advertisement contents, which have been received therein from a content provider, to a smart card 500, a user terminal 400 requests a personalized advertisement as a messaging service is received through the SMS-C 100 or the MMS-C 200, and displays appropriate advertisement, and the smart card 500 extracts and provides the personalized advertisement through a SCWS (smart card web server) function embedded therein based on a USIM (universal subscriber identity module) as the user terminal 400 requests the personalized advertisement. The advertisement providing server 300 stores at least one updated advertisement content that is received therein from the content provider, and provides a download service for the advertisement contents, which have been stored, according to the request of the smart card 400 to store advertisement contents based on the SCWS function.

The user terminal 400 requests a personalized advertisement from the smart card 500 as the user terminal 400 receives a messaging service through a mobile communication network, that is, from the SMS-C 100 or the MMS-C 200. The user terminal 400 downloads and displays advertisement contents linked based on information about a uniform resource location (URL information) for the advertisement contents, which is received from the smart card 500 according to the request for the personalized advertisement. In more detail, the user terminal 400 displays the URL information of advertisement contents, which has been received from the smart card 400 on a screen to display the messaging service received through the mobile communication network. When receiving user intention to receive the advertisement contents through the message service screen, the user terminal 400 downloads linked advertisement contents. In this case, the user terminal 400 accesses an SCWS (smart card web server) embedded in the smart card 500 or the advertisement providing server 300 based on the URL information of advertisement contents, thereby downloading and displaying appropriate advertisement contents having the form of a predetermined file such as an HTML or an image file.

The smart card 500 searches for stored and processed personalized information according to the request for the personalized advertisement and extracts meta data. In more detail, the smart card 500 stores personalized information extracted through a data mining scheme based on user data including user input information and a history about access to user request sites, which are stored based on the SCWS function, a call history through the user terminal 400, which has been stored based on the USIM, and base station information received from the user terminal 400. Accordingly, the smart card 500 searches for the personalized information according to the extraction request for the personalized information of the user terminal 400, and extracts the meta data. In detail, the smart card 500 extracts the personalized information including the preferences, favorites, interests and propensities of the user by performing the data mining based on the user information, such as the call history, location history, purchase history, visit history and personal information. The data mining may be performed through the mining mechanism including the neural network, K-means clustering and decision tree.

The smart card 500 searches for advertisement contents based on the extracted meta data, and provides URL information of the searched advertisement contents to the user terminal 400. In more detail, the smart card 500 searches for advertisement contents, which have been updated over the advertisement providing server 300, or advertisement contents stored in the smart card 500 based on the SCWS function according to the meta data, and provides URL information about the searched advertisement contents to the user terminal 400.

In other words, when an SMS notifying the acceptance of an MMS is received into the user terminal 400, the smart card 500 receives the MMS from the MMS-C 200 and then extracts a personalized advertisement. Therefore, the smart card 500 adds URL information about advertisement contents according to the extraction result of the personalized advertisement to the MMS, and then delivers the MMS to the user terminal 400.

Meanwhile, a configuration of extracting and providing advertisements suitable for personalized information by obtaining various kinds of personal information based on a personalized advertisement function (e.g., an embedded SCWS function and a USIM function) of the smart card 500 can be realized by running a specific application embedded in the form of an applet based on the SCWS function.

As described above, the smart card 500 can contain various applications including a function of providing advertisements by obtaining personalized information and having the form of an applet based on the SCWS function. One embodiment of the above installation environment will be described with reference to FIG. 3 below.

To register a specific service based on an SCWS function embedded in the smart card 500, the present invention additionally provides an application server 600 that receives a service subscription request from an access user, a service gateway 700 that receives the service subscription request from the application server 400 to perform service registration in cooperation with the smart card 500, and a remote control server 800 that forms an interface with the user terminal 400 and mediates the interface between the service gateway 700 and the user terminal 400.

The application server 600 contains at least one smart-card-based service application. For example, the application server 600 receives a subscription request for a specific service from a user access to the application server 600 through a predetermined protocol including an HTTP protocol (XML over TCP/IP), and transmits the service subscription request including user input information to the service gateway 700 such that the specific service can be provided according to the user request.

In order to perform a service registration procedure according to the service subscription request received from the application server 600, the service gateway 700 determines based on the user input information if a user has been authenticated and the user terminal 400 supports the specific service. In more detail, the service gateway 700 previously stores user information including subscriber information and user terminal information, and determines the user authentication and the support state of the user terminal 400 for the specific service based on user input information and user information contained in the service subscription request.

The service gateway 700 requests the registration of the specific service through the interface with the smart card 500. In more detail, the service gateway 700 sets parameters, which are used to resister the specific service on the smart card 500, through a predetermined scheme such as a finite state machine (FSM) scheme. In other words, the service gateway 700 establishes a session with the smart card 500 through an over-the-air (OTA) message cooperating with the remote control server 800, and transmits an appropriate URL address to a specific sector on an SCWS (smart card web server) through the session, so that protection set values for the definition of a communication scheme with the smart card 500 and an authentication scheme of the smart card 500 are primarily set. In this case, the communication scheme defined based on the protection set values may include an OTA message scheme and a transport layer security (TLS) session scheme. The authentication scheme of the smart card 500 is a typical authentication scheme for wireless data communication based on the SCWS. Meanwhile, in order to perform service registration, the service gateway 700 creates an identity (ID) for the specific service on the smart card 500 and maps the ID for the specific service with the URL address. Further, the service gateway 700 assigns the protection set values to the ID, thereby completing parameter setting for service registration.

In addition, when parameters for the specific service registration have been completely set, the service gateway 700 transmits contents for the realization of the specific service. In more detail, the service gateway 700 transmits the contents for the realization of the specific service previously registered in the application server 600 to the URL address on the smart card 500 through an OTA message or the session formed based on an authentication scheme according to protection set values set through a parameter setting procedure.

Through the above structure, the smart card 500 receives the OTA message cooperating with the remote control server 800 from the service gateway 700 through the user terminal 400 to establish a session with the remote control server 800. As the service gateway 700 requests service registration through the session, parameters for the specific service registration are set. In more detail, the smart card 500 receives the URL address from the service gateway 700 through the session to set the protection set values for the definition of the communication scheme with the service gateway 700 and the authentication scheme. In addition, the smart card 500 creates the ID for the specific service and maps the ID for the specific service with the URL address. The smart card 500 assigns the protection set values to the ID, thereby completing parameter setting for the service registration. Further, the smart card 500 stores the contents, which are used for the realization of the specific service received from the service gateway 700 through the OTA message or the session based on the authentication scheme according to the protection set values, in an appropriate URL address of the SCWS, thereby completing the registration for the specific service.

As described above, according to the advertisement service system based on the smart card 500 of the present invention, personalized information is obtained based on the SCWS function and the USIM embedded in the smart card 500, and a messaging advertisement service is realized based on the personalized information to provide user information extracted through personal behavior analysis, so that the user can be attracted by the active and interesting participation entailed.

Figure 3:
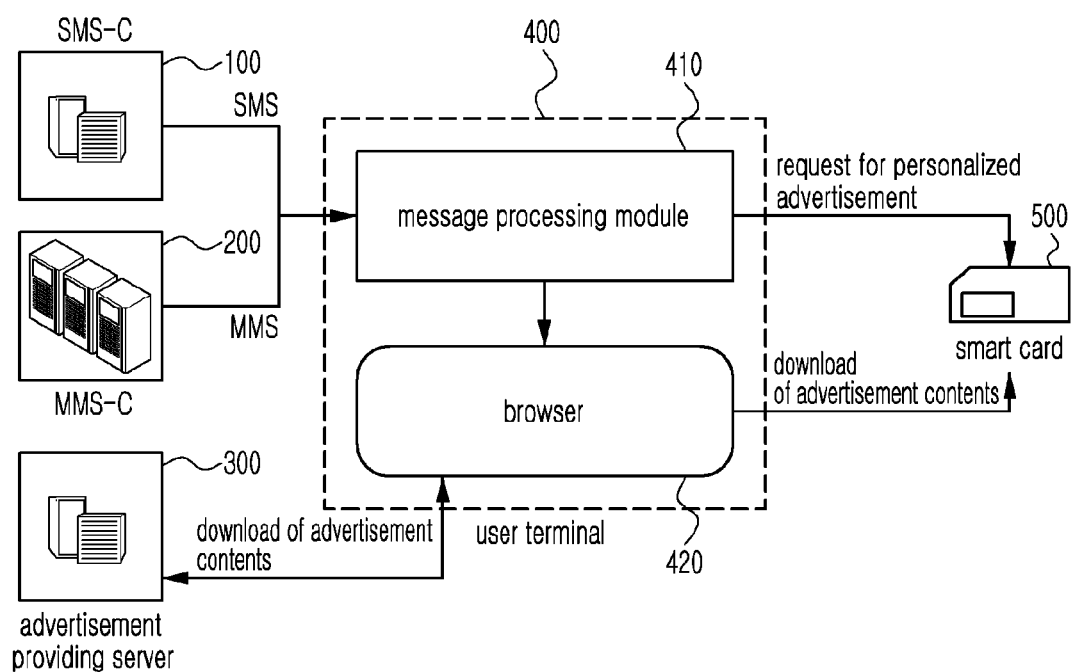
FIG. 3 is a schematic view showing a user terminal according to an embodiment of the present invention.
Figure 4:
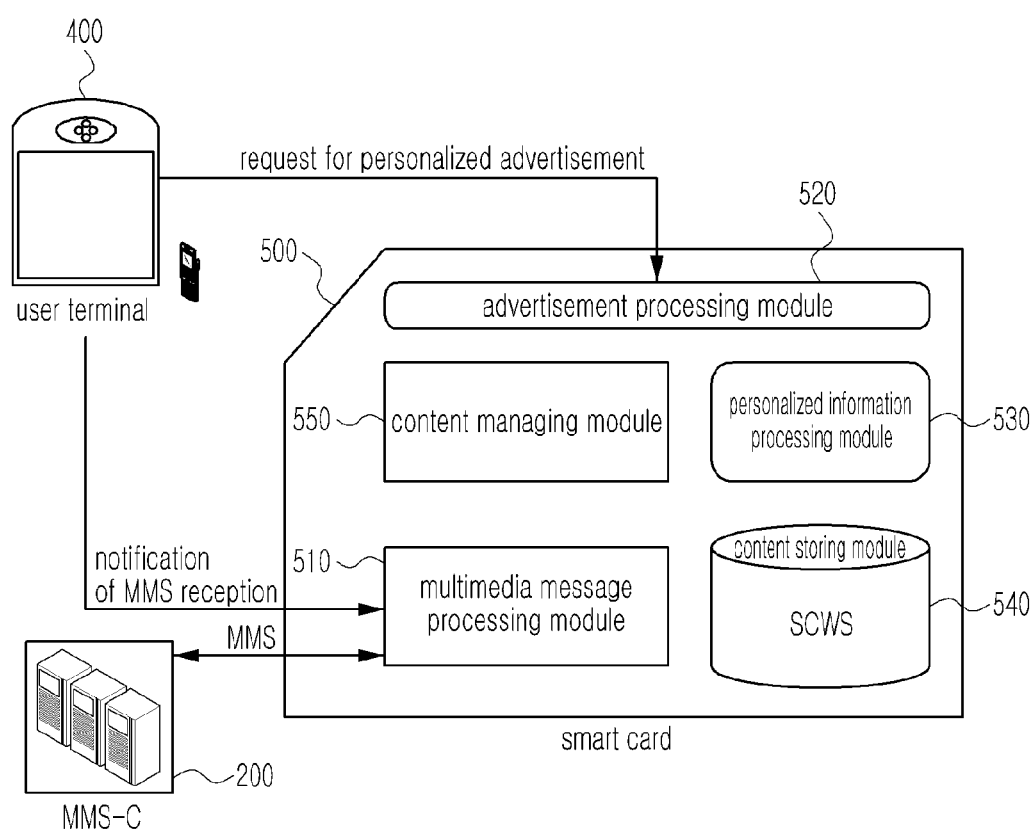
FIG. 4 is a schematic view showing a smart card according to an embodiment of the present invention.

Hereinafter, the structure of the user terminal 400 and the smart card 500 will be described in detail with reference to FIGS. 3 to 4.

Hereinafter, the structure of the user terminal 400 will be first described. The user terminal 400 includes a message processing module 410 and a browser 420.

The message processing module 410 requests a personalized advertisement to the smart card 500 as the user terminal 400 receives the messaging service through the mobile communication network. In more detail, the message processing module 410 requests the personalized advertisement to the smart card 500 when receiving an SMS from the SMS-C 100. Meanwhile, when receiving an SMS of notifying the user terminal 400 that an MMS has been received from the MMS-C 200, the message processing unit 401 reports this SMS reception to the smart card 400, so that the smart card 400 can obtain the MMS through the access to an appropriate MMS-C 200 and extracts a personalized advertisement.

In addition, the message processing module 410 displays the URL information of advertisement contents received from the smart card 500 according to the request for a personalized advertisement on the screen on which the messaging service (preferably, an SMS) received through the mobile communication network is displayed. Accordingly, when receiving user intention to receive the advertisement contents through the message service screen, the message processing module 410 requests that the browser 420 downloads advertisement contents.

The browser 420 downloads and displays advertisement contents linked based on the URL information of the advertisement contents according to the request of the message processing module 410. In more detail, the browser 420 accesses to the SCWS embedded in the smart card 400 based on the URL information of the advertisement contents received from the smart card 500, or accesses to the advertisement providing server 300 to download and display appropriate advertisement contents having the form of a predetermined file such as an HTML file or an image file.

Meanwhile, when receiving an MMS from the MMS-C 200, the browser 420 displays an MMS including the URL information of advertisement contents received from the smart card 500. When receiving the user intention to receive the advertisement contents through the display screen, the browser 420 downloads the advertisement contents as described above.

As described above, according to the structure of the user terminal 400 of the present invention, a core function related to providing an advertisement service is realized in the smart card 500, so that the user terminal 400 has the form of a dummy device retaining only input/output device resources. Accordingly, the manufacturing cost to develop a terminal can be reduced.

Hereinafter, the structure of the smart card 500 will be described secondly with reference to FIG. 4. The smart card 500 includes a multimedia message processing module 510, an advertisement processing module 520, a personalized information processing module 530, a content storing module 540, and a content managing module 550.

When the SMS of notifying the user terminal 400 that an MMS has been received, the multimedia message processing module 510 obtains an appropriate MMS from the MMS-C 200 according to the request of the user terminal 400, and then requests personalized advertisements to the advertisement processing module 520. Accordingly, the multimedia message processing module 520 transmits an MMS with the URL information of advertisement contents (which is a result of the request for a personalized advertisement) received therein from the advertisement processing module 520 to the user terminal 400.

The advertisement processing module 520 downloads advertisement contents, which are periodically updated from the advertisement providing server 300, and stores the advertisement contents in the content storing module 540.

The advertisement processing module 520 requests the extraction of personalized information to the personalized information processing module 530 according to the request for personalized information of the user terminal 400 resulting from the reception of the SMS or the request for the personalized advertisement of the multimedia message processing module 510 resulting from the reception of the MMS. Accordingly, the advertisement processing module 520 extracts meta data by searching for personalized information extracted and transmitted from the personalized information processing module 530, and provides the meta data to the content managing module 530.

The personalized information processing module 530 stores personalized information extracted through a data mining scheme based on user data including user input information and a history about access to user request sites, which are stored based on the SCWS function, a call history through the user terminal 400, which has been stored based on the USIM, and base station information received from the user terminal 400. Accordingly, the personalized information processing module 530 searches for the personalized information according to the extraction request for the personalized information of the advertisement processing module 520, and extracts the meta data. For reference, the personalized information processing module 530 performs the data mining scheme based on collected user information including a call history, a location history, a purchase history, a visit history, and personal information, thereby extracting personalized information representing the preferences, favorites, interests and propensities of each user. In this case, the data mining may be performed through a mining mechanism including a neural network, a K-means clustering scheme, and a decision tree.

The content storing module 540 stores updated advertisement contents downloaded from the advertisement providing server 300 through the advertisement processing module 520 on the basis of the SCWS function. The content managing module 550 searches for advertisement contents, which are stored in the content storing module 540, based on the extracted meta data received therein from the advertisement processing module 520, and provides URL information of the searched advertisement contents. In more detail, the content managing module 550 searches for advertisement contents, which have been updated in the advertisement providing server 300, or advertisement contents stored in the content storing module 540 based on the SCWS function according to the meta data, which have been received therein from the advertisement processing module 520, and provides URL information about the searched advertisement contents to the user terminal 400.

As described above, according to the structure of the smart card 500 of the present invention, as the smart card 500 obtains personalized information based on an SCWS function and the USIM embedded in the smart card 500, even if the smart card 500 does not cooperate with a network server, the smart card 500 obtains various kinds of personal information therein to extract advertisements suitable for the personalized information and provide the advertisements to the user terminal 400.

Hereinafter, an advertisement service method based on the smart card 500 according to one embodiment of the present invention will be described with reference to FIGS.

5 to 10. Hereinafter, for the purpose of explanation, the same reference numerals will be assigned with the same elements as those of FIGS. 1 to 4.

In addition, components of the advertisement service system based on the smart card 500 according to the present invention have various operating features according to the types of a messaging service received through a mobile communication network, preferably, according to reception of an SMS or an MMS, and the operating features are distinguished from each other in the following description.

Hereinafter, the operating method of the advertisement service system based on the smart card 500 according to an embodiment of the present invention will be described with reference to FIGS. 5 and 6.

Figure 5:
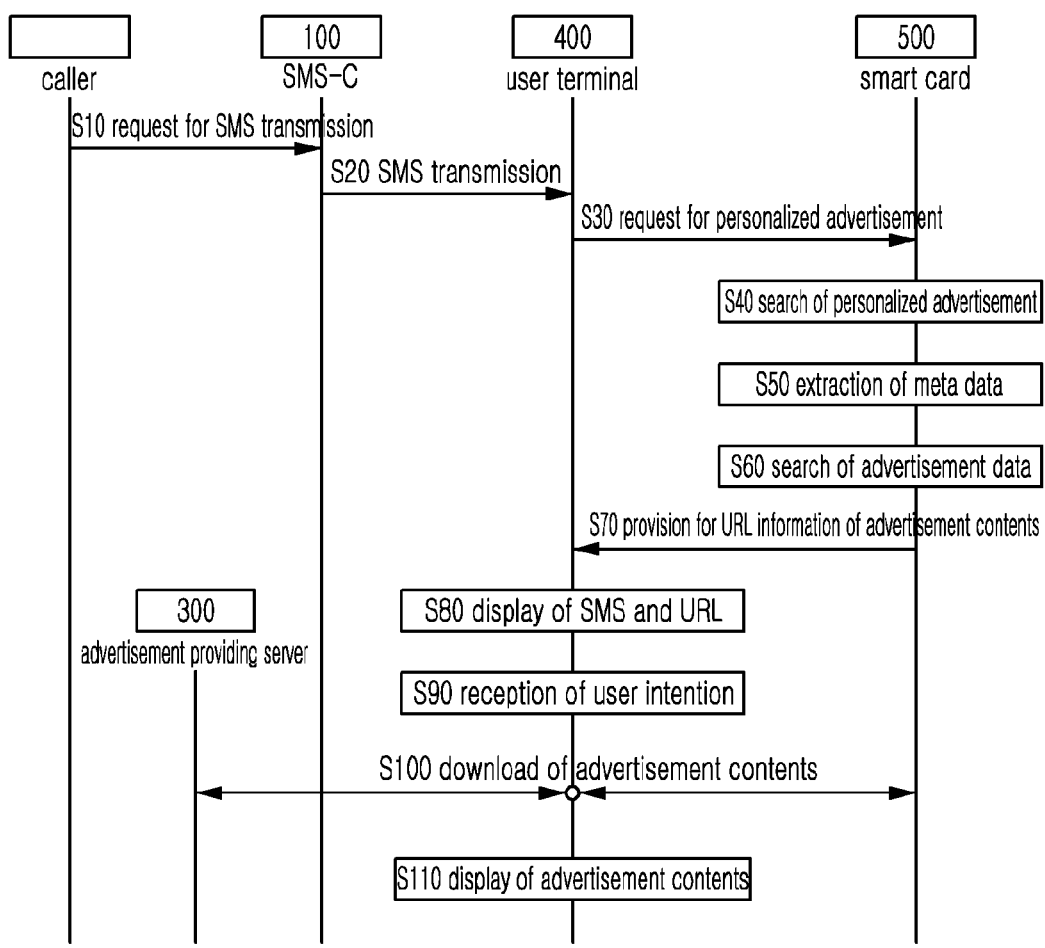
FIGS. 5 and 6 are flowcharts showing the operating method of an advertisement service system based on a smart card according to an embodiment of the present invention.

① Operating Features According to Reception of an SMS Shown in FIG. 5

The user terminal 400 requests a personalized advertisement to the smart card 500 as the user terminal 400 receives an SMS through the mobile communication network (steps S10 to S30). Preferably, the user terminal 400 requests the personalized advertisement to the smart card 500 as the user terminal 400 receives a messaging service through the mobile communication network, that is, an SMS from the SMS-C 100.

Next, as the user terminal 400 requests the personalized advertisement, the smart card 500 searches for stored and processed personalized information to extract meta data (steps S40 to S50). Preferably, the smart card 500 searches for personalized information extracted through a data mining scheme based on user data including user input information and a history about access to user request sites, which are stored based on the SCWS function, a call history through the user terminal 400, which has been stored based on the USIM, and base station information received from the user terminal 400. The smart card 500 extracts meta data based on the personalized information.

The smart card 500 searches for advertisement contents stored based on the SCWS function according to the extracted meta data, and provides the URL information of the advertisement contents (steps S60 to S70). Preferably, the smart card 500 searches for advertisement contents updated in the advertisement providing server 300 based on the meta data or advertisement contents embedded in the smart card 500 based on the SCWS function, and provides the URL information of the advertisement contents to the user terminal 400.

The user terminal 400 downloads and displays advertisement contents based on the URL information for the advertisement contents (steps S80 to S110). The user terminal 400 displays the URL information of the advertisement contents received from the smart card 400 together with an SMS received from the SMS-C 100. When receiving user intention to receive the advertisement contents through the display screen, the user terminal 400 downloads linked advertisement contents. In this case, the user terminal 400 accesses an SCWS embedded in the smart card 500 or the advertisement providing server 300 based on the URL information of the advertisement contents, thereby downloading and displaying appropriate advertisement contents having the form of a predetermined file such as an HTML or an image file.

Figure 6:
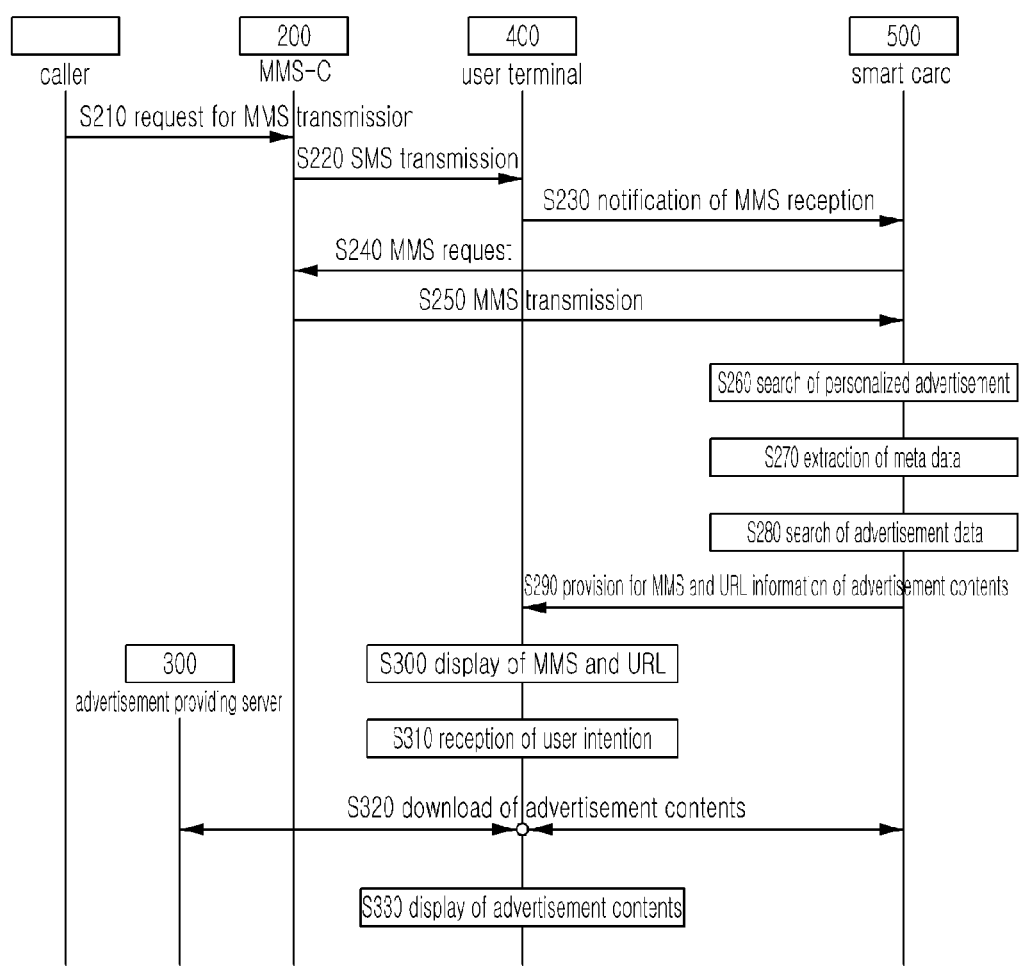

② Operating Features According to Reception of an MMS Shown in FIG. 6

As the user terminal 400 receives an SMS of notifying the user terminal 400 that an MMS has been received from the MMS-C 200 through a mobile communication network, the user terminal 400 notifies the smart card 500 of the reception state of the MMS (steps S210 to S230). Preferably, when receiving the SMS of notifying the user terminal 400 that an MMS has been received from the MMS-C 200, the user terminal 400 reports this SMS reception to the smart card 500.

Thereafter, according to the notification of the user terminal 400 in relation to the reception state of the MMS, the smart card 500 obtains an appropriate MMS from the MMS-C 200 (steps S240 to S250).

Thereafter, the smart card 500 searches for stored and processed personalized information and extracts meta data (steps S260 to S270). Preferably, the smart card 500 searches for personalized information extracted through a data mining scheme based on user data including user input information and a history about access to user request sites, which are stored based on the SCWS function, a call history through the user terminal 400, which has been stored based on the USIM, and base station information received from the user terminal 400. Then, the smart card 500 extracts meta data based on the personalized information.

Then, the smart card 500 searches for advertisement contents embedded based on the SCWS function according to the meta data and provides the URL information of the advertisement contents (steps S280 to S290). The smart card 500 searches for advertisement contents updated in the advertisement providing server 300 or advertisement contents embedded in the smart card 500 based on the SCWS function according to the meta data. Then, the smart card 500 provides an MMS obtained from the MMS-C 200 to the user terminal 400 together with the URL information of the advertisement contents.

Thereafter, the user terminal 400 downloads and displays advertisement contents based on the URL information of the advertisement contents received from the smart card 500 (step S300 to step S330). Preferably, the user terminal 400 displays an MMS including the URL information of the advertisement contents, which is received from the smart card, and downloads the linked advertisement contents when receiving user intention to receive the advertisement contents through the display screen. In this case, the user terminal 400 downloads and displays appropriate advertisement contents having the form of a predetermined file such as an HTML or an image file by accessing the SCWS embedded in the smart card 500 or the advertisement providing server 300 based on the URL information of advertisement contents As described above, according to the operating method of the advertisement service system based on the smart card 500 according to the present invention, personalized information is obtained based on the SCWS function and the USIM embedded in the smart card 500, and a messaging advertisement service based on the personalized information is realized, thereby providing information obtained by focusing on the user and extracted through personal behavior analysis. Accordingly, the user can be attracted by the active and interesting participation entailed. Hereinafter, the operating method of the user terminal 400 according to one embodiment of the present invention will be described with reference to FIGS. 7 and 8.

Figure 7:
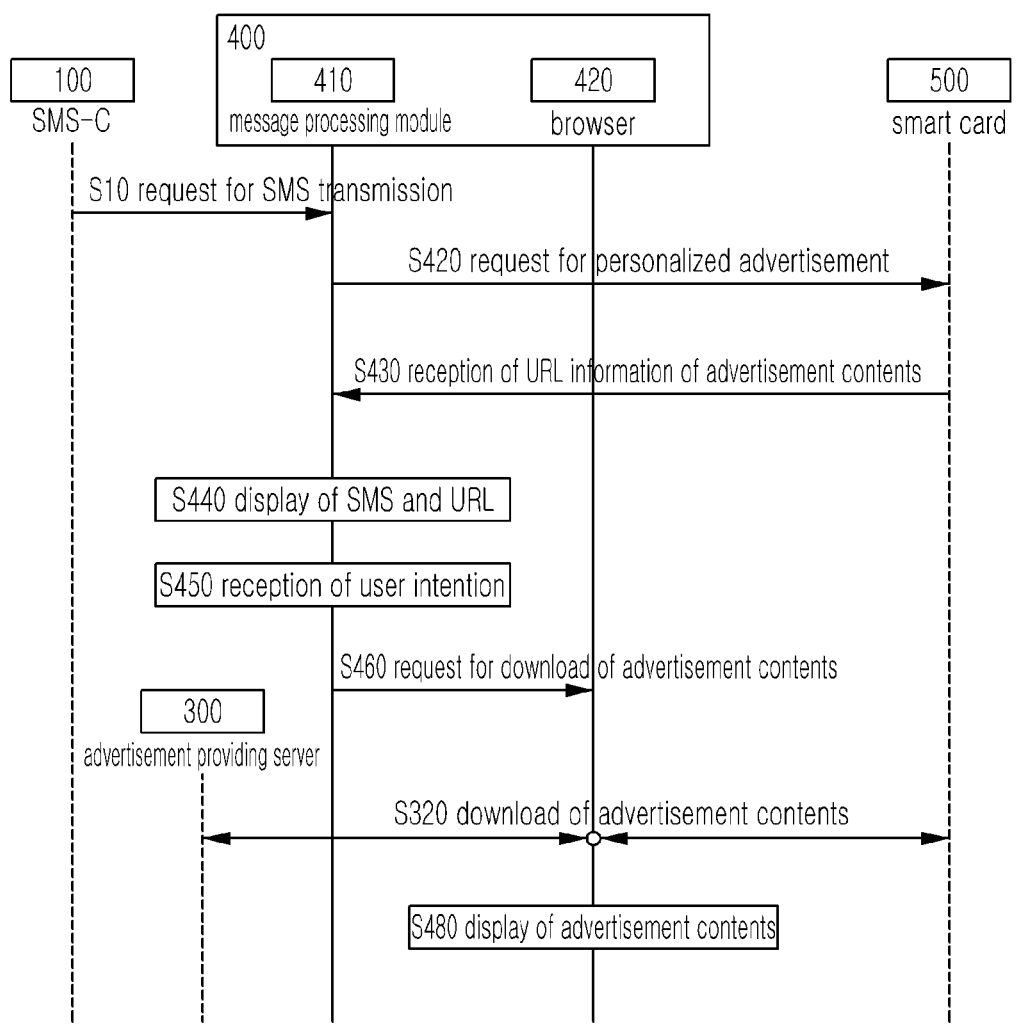
FIGS. 7 and 8 are flowcharts showing the operating method of a user terminal according to an embodiment of the present invention.

① Operating Features According to Reception of an SMS Shown in FIG. 7

First, the user terminal 400 requests a personalized advertisement to the smart card 500 as the user terminal 400 receives an SMS through a mobile communication network (steps S410 to S420 corresponding to steps S20 to S30 of FIG. 5. Preferably, as the message processing module 410 requests the personalized advertisement to the smart card 500 according to the reception of the SMS from the SMS-C 100.

Next, the user terminal 400 displays the URL information of the advertisement contents received from the smart card 500 according to the request of the personalized advertisement (steps S430 to S440 corresponding to steps S70 to S80 of FIG. 5). Preferably, the message processing module 410 displays the SMS received from the SMS-C 100 together with the URL information of the advertisement contents received from the smart card 500.

Thereafter, when user intention to receive the advertisement contents is received through the display screen, the download of the advertisement contents is requested (steps S450 to S460 corresponding to step 90 of FIG. 5). Preferably, when user intention to receive the advertisement contents is received through the display screen, the message processing module 410 requests the download for the advertisement contents to the browser 420.

Then, advertisement contents linked based on the URL information of the advertisement contents are downloaded according to the download request and displayed (step S470 to S480 corresponding to step S100 to S110 of FIG. 5). Preferably, the browser 420 accesses to the SCWS embedded in the smart card 400 based on the URL information of the advertisement contents received from the smart card 500, or accesses to the advertisement providing server 300 to download and display appropriate advertisement contents having the form of a predetermined file such as an HTML file or an image file.

Figure 8:
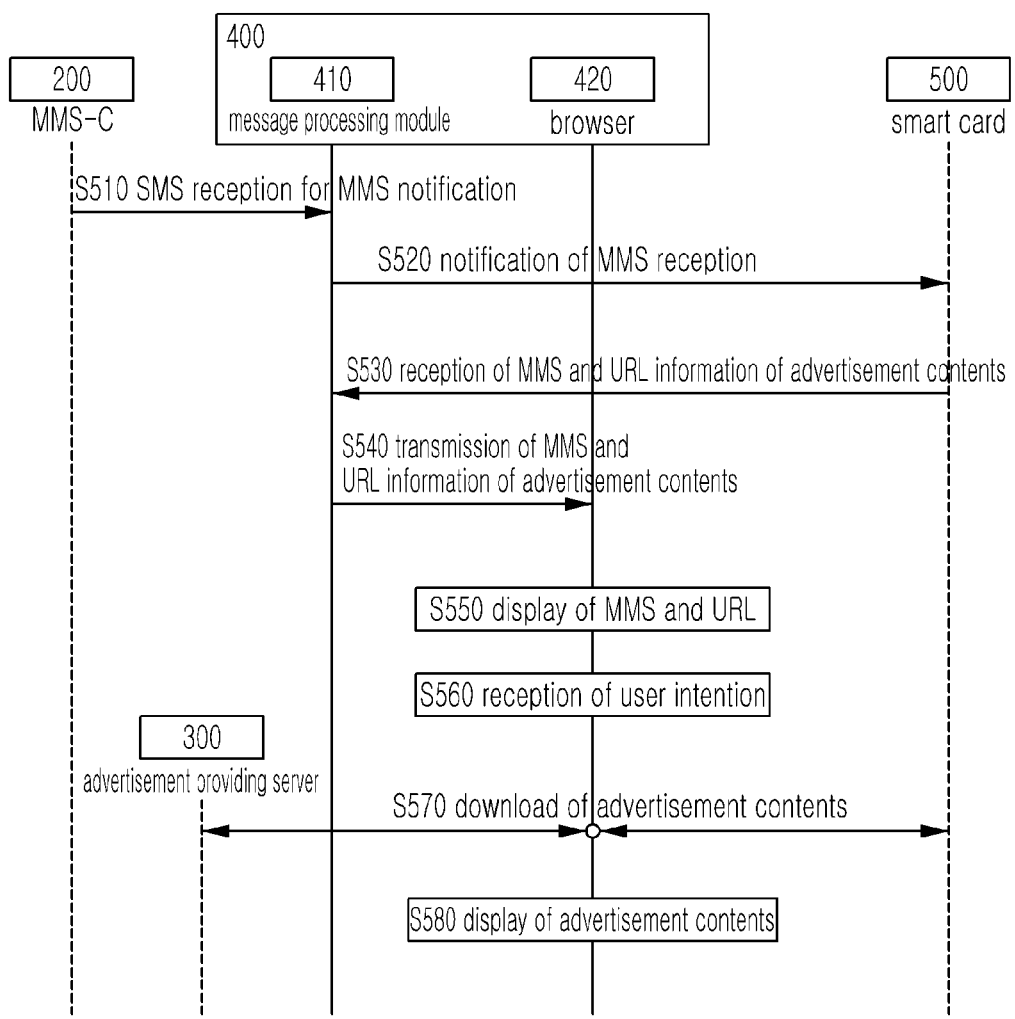

② Operating Features According to Reception of an MMS Shown in FIG. 8

As the user terminal 400 receives an SMS of notifying the user terminal 400 that an MMS has been received through a mobile communication network, the user terminal 400 notifies the smart card 500 of the reception state of the MMS (steps S510 to S520 corresponding to steps S220 to S230 of FIG. 6). Preferably, when receiving the SMS of notifying the user terminal 400 that an MMS has been received from the MMS-C 200, the user terminal 400 reports this SMS reception to the smart card 500.

Then, the URL information of the advertisement contents received from the smart card 500 according to the request for the personalized advertisement is displayed (steps S530 to S550 corresponding to steps S290 to S300 of FIG. 6). Preferably, the browser 420 receives the MMS including the URL information of the advertisement contents received from the smart card 500 through the message processing module 410 and then displays the MMS including the URL information.

When user intention to receive the advertisement contents through the display screen is received, advertisement contents linked based on the URL information of the advertisement contents are downloaded and displayed (steps S560 to S580 corresponding to steps S310 to S330). Preferably, when user intention to receive the advertisement contents through the display screen is received, the browser 420 downloads and displays appropriate advertisement contents having the form of a predetermined file such as an HTML or an image file by accessing the SCWS embedded in the smart card 500 or the advertisement providing server 300 based on the URL information of advertisement contents received from the smart card 500.

As described above, according to the operating method of the user terminal 400 of the present invention, a core function related to providing an advertisement service is realized in the smart card 500, so that the user terminal 400 has the form of a dummy device retaining only input/output device resources. Accordingly, manufacturing costs in developing a terminal can be reduced.

Hereinafter, the operating method of the smart card 500 according to an embodiment of the present invention will be described with reference FIGS. 9 and 10.

Figure 9:
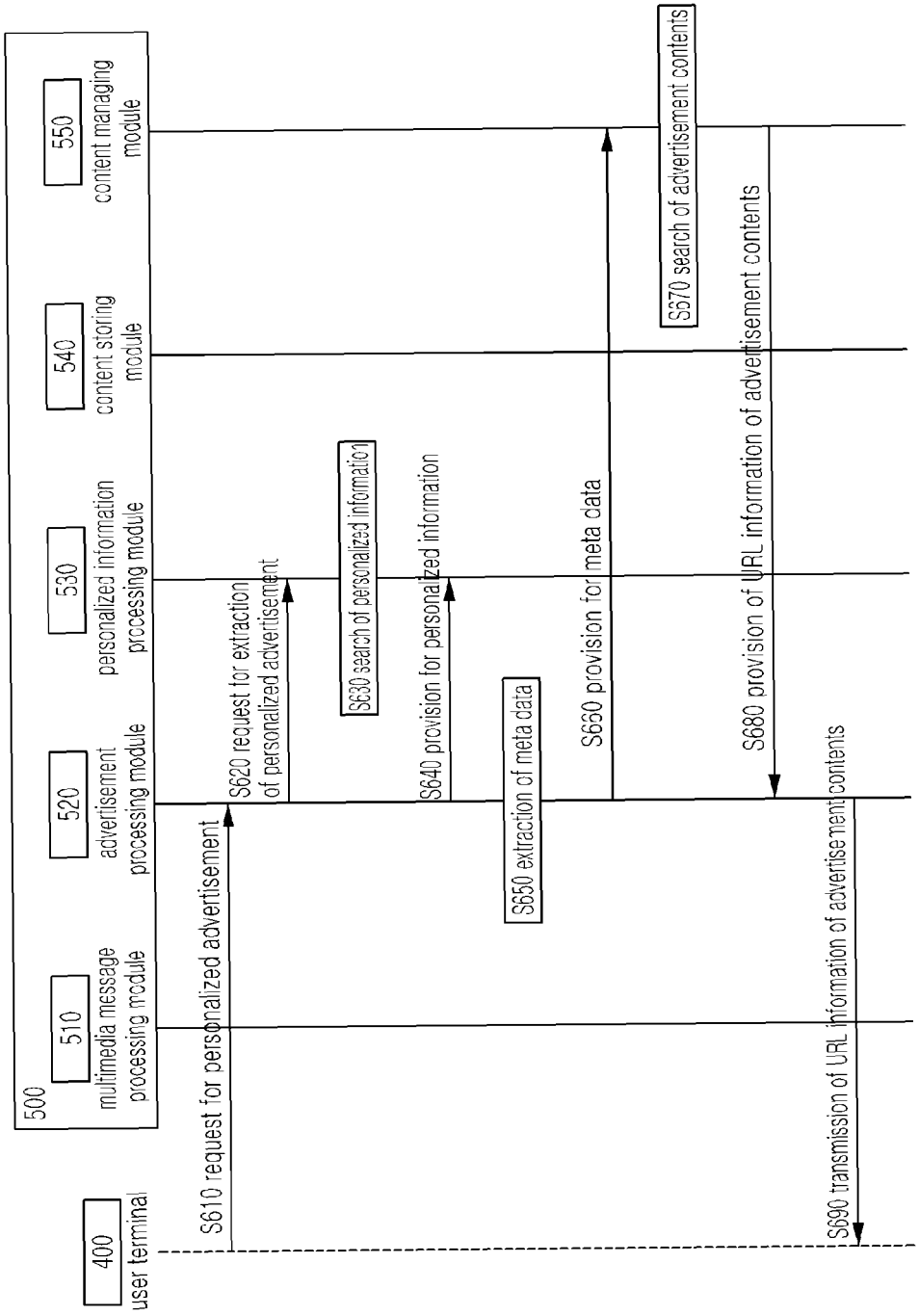
FIGS. 9 and 10 are flowcharts showing the operating method of a smart card according to an embodiment of the present invention.

① Operating Features According to Reception of an SMS Shown in FIG. 9

First, the smart card 500 receives the request for a personalized advertisement from the user terminal 400 according to the reception of the SMS by the user terminal 400 (steps S610 to S620 corresponding to step S30 of FIG. 5). Preferably, the advertisement processing module 520 requests the extraction of the personalized information to the personalized information processing module 530 according to the request for the personalized advertisement of the user terminal 400 according to the reception of the SMS.

Next, the smart card 500 searches for the personalized information according to the reception for the personalized advertisement (step S630 to S640 corresponding to step S40 of FIG. 5). In more detail, the personalized information processing module 530 searches for personalized information extracted through a data mining scheme based on user data including user input information and a history about access to user request sites, which are stored based on the SCWS function, a call history through the user terminal 400, which has been stored based on the USIM, and base station information received from the user terminal 400. The personalized information processing module 530 provides the personalized information to the advertisement processing module 520.

Then, meta data are extracted by searching the personalized information (steps S650 to S660 corresponding to step S50 of FIG. 5). Preferably, the advertisement processing module 520 extracts the meta data by searching for the personalized information extracted and transmitted from the personalized information processing module 530, and provides the meta data to the content managing module 550.

Thereafter, advertisement contents stored based on the meta data are searched for, and the URL information of the advertisement contents is provided (steps S670 to S690 corresponding to steps S60 to S70 of FIG. 5). In more detail, the content managing module 550 searches for the advertisement contents stored in the content storing module 540 based on the SCWS function or the advertisement contents updated in the advertisement providing server 300 according to the meta data received from the advertisement processing module 520, and provides the URL information of the advertisement contents to the user terminal 400.

Figure 10:
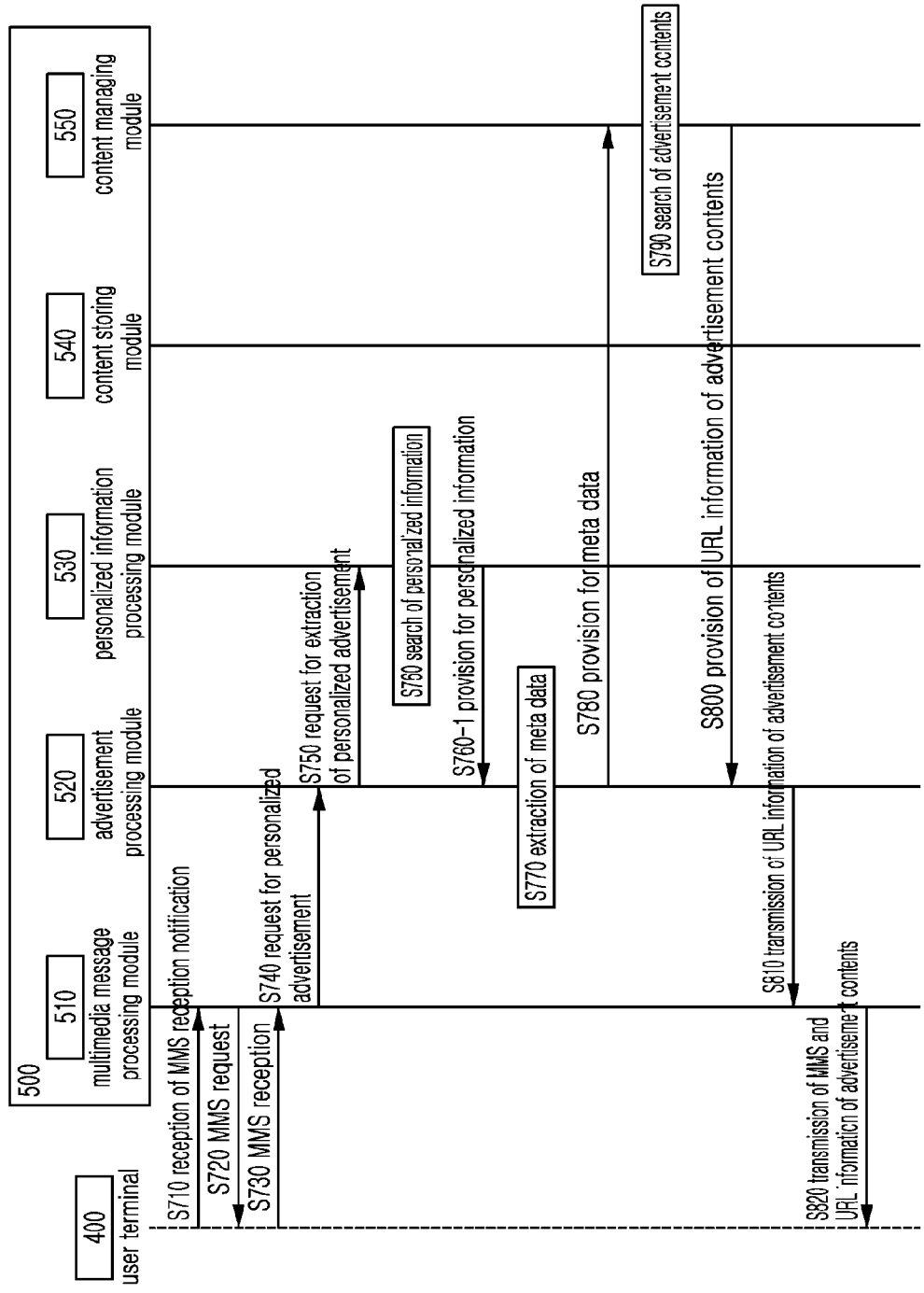

② Operating Features According to Reception of an MMS Shown in FIG. 10

First, the reception of the MMS is received from the user terminal 400 (steps S710 to S740 corresponding to steps S230 to S250). Preferably, when an SMS of notifying the user terminal 400 that an MMS has been received is received in the user terminal 400, the multimedia message processing module 510 obtains the MMS from the MMS-C 200 according to the request of the user terminal 400, and requests a personalized advertisement to the advertisement processing module 520.

Thereafter, the personalized information is extracted as the request for the personalized advertisement is received (steps S750 to S760 corresponding to step S260 of FIG. 6). In more detail, the personalized information processing module 530 extracts personalized information calculated through a data mining scheme based on user data including user input information and a history about access to user request sites, which are stored based on the SCWS function, a call history through the user terminal 400, which has been stored based on the USIM, and base station information received from the user terminal 400. Then, the personalized information processing module 530 provides the extracted personalized information to the advertisement processing module 520.

Thereafter, the meta data are extracted by searching for the personalized information (steps S770 to S780 corresponding to step S270 of FIG. 6). Preferably, the advertisement processing module 520 extracts the meta data by searching for the personalized information extracted and transmitted from the personalized information processing module 530 and provides the meta data to the content managing module 550.

Thereafter, advertisement contents stored based on the meta data are searched for and the URL information of the advertisement contents are provided (steps S790 to S820 corresponding to steps S280 to S290 of FIG. 6). In more detail, the content managing module 550 searches for advertisement contents, which have been updated over the advertisement providing server 300, or advertisement contents stored in the content storing module 540 based on the SCWS function according to the meta data received from the advertisement processing module 520, and provides URL information about the searched advertisement contents to the multimedia message processing module 510.

Thereafter, the multimedia message processing module 510 transmits an MMS obtained from the MMS-C 200 and the URL information of advertisement contents (which is a result of the request for a personalized advertisement) received from the advertisement processing module 520 to the user terminal 400.

As described above, according to the structure of the smart card 500 of the present invention, as the smart card 500 obtains personalized information based on an SCWS function and the USIM embedded in the smart card 500, even if the smart card 500 does not cooperate with a network server, the smart card 500 can obtain various kinds of personal information therein to extract advertisements suitable for the personalized information and provide the advertisements to the user terminal 400.

The method and steps of the algorithm described above related to the embodiments of the present invention may be realized in the form of hardware, software executed by a processor, or a combination of the hardware and software. The software module may reside in a storage medium, such as a RAM memory, a flash memory, a ROM memory, an EPROM memory, an EEPROM memory, registers, a hard disc, a mobile disc, a CD-ROM, or other storage devices generally known in the art. The storage medium is connected to the processor, so that the processor may read information from the storage medium or record the information onto the storage medium. Alternatively, the storage medium can be integrated in the processor. The processor and the storage medium may be included in an ASIC. The ASIC may be included in the terminal. Alternatively, the processor and the storage medium may serve as components of the terminal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

According to a method and a system for providing an advertisement service and a smart card applied to the same, the personal information stored in the smart card is utilized in cooperation with an SCWS (smart card web server), so that a personalized messaging advertisement service can be provided to the user. Thus, the present invention overcomes the problems occurring in the prior art, so that the present invention is applicable in various fields in terms of sales and business and very useful in practice with higher industrial applicability.

The invention claimed is:

1. A smart card for providing personalized advertisement in cooperation with a user terminal based on a smart card web server function, the smart card comprising a processor configured as:
   an advertisement processing module for sending a request for extraction of personalized information when a request for personalized advertisement is received from the user terminal, extracting and providing meta data by searching for the extracted personalized information, and transmitting a uniform resource locator of advertisement contents, which is searched for based on the meta data, to the user terminal;
   a personalized information processing module for storing processed personalized information according to operation of the smart card, extracting the personalized information according to the request for extraction of the personalized information from the advertisement processing module, and providing the personalized information to the advertisement processing module;
   a content storing module for storing updated advertisement contents provided from an advertisement providing server through the advertisement processing module; and
   a content managing module for searching for advertisement contents stored in the content storing module based on the meta data received from the advertisement processing module and providing the uniform resource locator of the advertisement contents to the advertisement processing module.

2. The smart card of claim 1, further comprising a multimedia message processing module for obtaining a multimedia message from a multimedia message service center, sending a request for personalized advertisements to the advertisement processing module, and transmitting the multimedia message including the uniform resource locator of the advertisement contents received from the advertisement processing module to the user terminal, as the user terminal receives a short message notifying the user terminal that the multimedia message is received.

3. The smart card of claim 1, wherein the personalized information processing module is configured to perform a data mining scheme with respect to user data including user input information and a history about access to user-requested sites, which are stored based on the smart card web server function, a call history through the user terminal, which has been stored based on a universal subscriber identity module, and base station information received from the user terminal, so that the personalized information is extracted.

4. The smart card of claim 1, wherein the content managing module is configured to search for advertisement contents updated in the advertisement providing server based on the meta data received from the advertisement processing module to provide the uniform resource locator of the advertisement contents.

5. A method of providing an advertisement service using a smart card, the method comprising:

sending, by a user terminal, a request for personalized advertisement to the smart card when a messaging service is received by the user terminal through a mobile communication network;

searching, by the smart card, for personalized information, which are stored and processed according to operation of the smart card, and extracting meta data when the request for personalized advertisement is received from the user terminal;

searching, by the smart card, for advertisement contents based on the meta data and providing, by the smart card and to the user terminal, a uniform resource locator of the advertisement contents; and downloading and displaying, by the user terminal, the advertisement contents linked to the uniform resource locator of the advertisement contents received from the smart card.

6. The method of claim 5, wherein the messaging service comprises a short message service or a multimedia message service.

7. The method of claim 5, wherein the downloading comprises downloading the linked advertisement contents by accessing a smart card web server installed in the smart card or an advertisement providing server that provides a download service for updated advertisement contents from a content provider based on the uniform resource locator of the advertisement contents.

\* \* \* \* \*